United States Patent
Nishinosono et al.

(10) Patent No.: US 8,960,233 B2
(45) Date of Patent: Feb. 24, 2015

(54) SOLENOID VALVE

(75) Inventors: Hiroyuki Nishinosono, Tokyo (JP);
Yoshinari Kasagi, Tokyo (JP)

(73) Assignee: Eagle Industry Co., Ltd., Tokyo (JP)

( * ) Notice: Subject to any disclaimer, the term of this patent is extended or adjusted under 35 U.S.C. 154(b) by 711 days.

(21) Appl. No.: 13/320,092

(22) PCT Filed: Sep. 17, 2010

(86) PCT No.: PCT/JP2010/066194
§ 371 (c)(1),
(2), (4) Date: Nov. 11, 2011

(87) PCT Pub. No.: WO2011/065114
PCT Pub. Date: Jun. 3, 2011

(65) Prior Publication Data
US 2012/0056117 A1 Mar. 8, 2012

(30) Foreign Application Priority Data
Nov. 27, 2009 (JP) .................. 2009-270605

(51) Int. Cl.
*F16K 31/06* (2006.01)
*F15B 13/04* (2006.01)
*F16K 11/07* (2006.01)

(52) U.S. Cl.
CPC ......... *F16K 31/0613* (2013.01); *F15B 13/0402* (2013.01); *F16K 11/07* (2013.01)
USPC ............. 137/625.64; 137/625.65; 137/625.69

(58) Field of Classification Search
USPC ........ 251/129.1, 129.15; 137/625.64, 625.65, 137/625.69
See application file for complete search history.

(56) References Cited

U.S. PATENT DOCUMENTS

| | | | | |
|---|---|---|---|---|
| 2,969,045 A | * | 1/1961 | Clar | 137/625.69 |
| 2,981,287 A | * | 4/1961 | Caslow | 137/625.64 |
| 3,200,847 A | * | 8/1965 | Gillmore et al. | 137/625.65 |
| 4,353,394 A | * | 10/1982 | Loup | 251/129.1 |
| 4,574,843 A | * | 3/1986 | Loup et al. | 137/625.65 |
| 4,635,683 A | * | 1/1987 | Nielsen | 137/625.65 |
| 5,108,070 A | * | 4/1992 | Tominaga | 251/129.1 |
| 5,598,871 A | * | 2/1997 | Sturman et al. | 137/625.69 |
| 5,785,087 A | * | 7/1998 | Takahashi et al. | 137/625.65 |

(Continued)

FOREIGN PATENT DOCUMENTS

| | | |
|---|---|---|
| JP | H04/041168 | 4/1992 |
| JP | 2000-227172 A | 8/2000 |

(Continued)

OTHER PUBLICATIONS

International Search Report (in Japanese with English translation) for PCT/JP2010/066194, mailed Oct. 26, 2010; ISA/JP.

*Primary Examiner* — John Bastianelli
(74) *Attorney, Agent, or Firm* — Harness, Dickey & Pierce, PLC

(57) ABSTRACT

A solenoid valve 10 including a valve sleeve 41, and a solenoid portion 20 which is mounted at one end along axial direction of the valve sleeve 41. A plurality of ports 51 to 54 are formed on the valve sleeve 41. In at least an outlet port 51 of the plurality of ports, a relation of $S1 \geq S0$ is fulfilled, where S1 is an opening area of valve portion when the spool 60 moves in an axial direction to maximally open the valve portion between the outlet port 51 and the internal flow passage 47, and S0 is the total flow passage cross-sectional area.

6 Claims, 4 Drawing Sheets

$S1 = \pi \times D1 \times Wmax$
$S0 = 2 \times \pi \times (D0/2)^2$

(56) References Cited

U.S. PATENT DOCUMENTS

| | | | |
|---|---|---|---|
| 6,659,121 B1 * | 12/2003 | Takahashi et al. | 137/625.65 |
| 6,739,293 B2 * | 5/2004 | Turner et al. | 137/625.64 |
| 2005/0217740 A1 | 10/2005 | Segi et al. | |
| 2005/0218363 A1 * | 10/2005 | Furuta et al. | 251/129.15 |
| 2008/0308757 A1 * | 12/2008 | Nakai et al. | 251/129.15 |
| 2009/0224192 A1 * | 9/2009 | Oikawa et al. | 251/129.15 |

FOREIGN PATENT DOCUMENTS

| | | |
|---|---|---|
| JP | 2001-153245 A | 6/2001 |
| JP | 2007-285457 | 11/2007 |
| WO | WO-2009/005149 A1 | 1/2009 |

* cited by examiner $S1 = \pi \times D1 \times Wmax$
$S0 = 2 \times \pi \times (D0/2)^2$

SOLENOID VALVE

CROSS-REFERENCE TO RELATED APPLICATIONS

This application is a 371 U.S. National Stage of International Application No. PCT/JP2010/066194, filed Sep. 17, 2010, and claims priority to Japanese patent application No. 2009-270605, filed Nov. 27, 2009, the disclosures of which are herein incorporated by reference in their entirety.

TECHNICAL FIELD

The present invention relates to a solenoid valve preferable to be applied in hydraulic control of a hydraulic system, for example.

BACKGROUND ART

For example, in a spool-type solenoid valve for hydraulic control shown in JP 2007-285457, it is necessary to increase a controlled flow amount of the solenoid valve for improving response characteristics of controlled hydraulic pressure. Therefore, it has conventionally been dealt with by expanding a valve opening amount of a valve portion, and expanding a flow passage cross-sectional area of each port of a valve sleeve, which is another hydraulic pressure route.

However, when the controlled flow amount is increased, there may be a risk to cause problems such that controllability is destabilized due to an increase in fluid force associated therewith and that contamination resistance is declined due to an increase in contamination amounts passing through the valve portion.

SUMMARY OF THE INVENTION

The present invention has been made under the above situation, and its purpose is to provide a solenoid valve having good control stability and excellent contamination resistance.

Means for Solving the Problem

To attain the above purpose, a solenoid valve according to the present invention comprises a valve sleeve, inside of which a spool is movably arranged in an axial direction, and a solenoid portion mounted on an axial end of the valve sleeve to give a force to move the spool in an axial direction, wherein a plurality of ports is formed in the valve sleeve to properly communicate to an internal flow passage internally formed in the valve sleeve; and a relation of $S1 \geq S0$ is fulfilled in at least an outlet port of the plurality of ports, where $S1$ is defined as an opening area of a valve portion between the outlet port and the internal flow passage when the spool moves in an axial direction to maximally open the valve portion, and $S0$ is defined as a total flow passage cross-sectional area of the outlet port.

For the solenoid valve according to the present invention, the relation of $S1 \geq S0$ is fulfilled, resulting in good control stability and excellent contamination resistance. Furthermore, the relation of $S1 \geq S0$ is fulfilled for the solenoid valve of the present invention, so that it is easy to finely adjust (set) the maximum flow amount.

Preferably, a ring-shaped groove extending in a circumferential direction is formed on an inner circumference surface of a valve seat of the valve sleeve where the outlet port is formed, and by moving the spool in an axial direction and blocking the ring-shaped groove with a large-diameter portion formed on the spool, the valve portion is closed to block communication of the outlet port and the internal flow passage.

Thus, providing a ring-shaped groove allows the flow of fluid from the internal flow passage to the outlet port through the valve portion to be smoother, and allows axial movement of the spool to the valve sleeve to be smoother.

Preferably, one or more of the outlet ports is formed, and a cross-section of each outlet port is circular. Such an outlet port can easily be formed by drilling work and the like after forming the valve sleeve by cutting work, which makes production of the valve sleeve easier.

Preferably, as with the outlet port, a relation of $S1' \geq S0'$ is fulfilled in at least an input port of the plurality of ports, where $S1'$ is defined as an opening area of a valve portion between the input port and the internal flow passage when the spool moves in an axial direction to maximally open the valve portion, and $S0'$ is defined as a total flow passage cross-sectional area of the input port.

In the solenoid valve according to the present invention, the relation of $S1' \geq S0'$ is fulfilled, resulting in good control stability and excellent contamination resistance. Furthermore, since the relation of $S1' \geq S0'$ is fulfilled in the solenoid valve of the present invention, it is easy to finely adjust (set) the maximum flow amount.

EMBODIMENTS OF THE INVENTION

Figure 1:
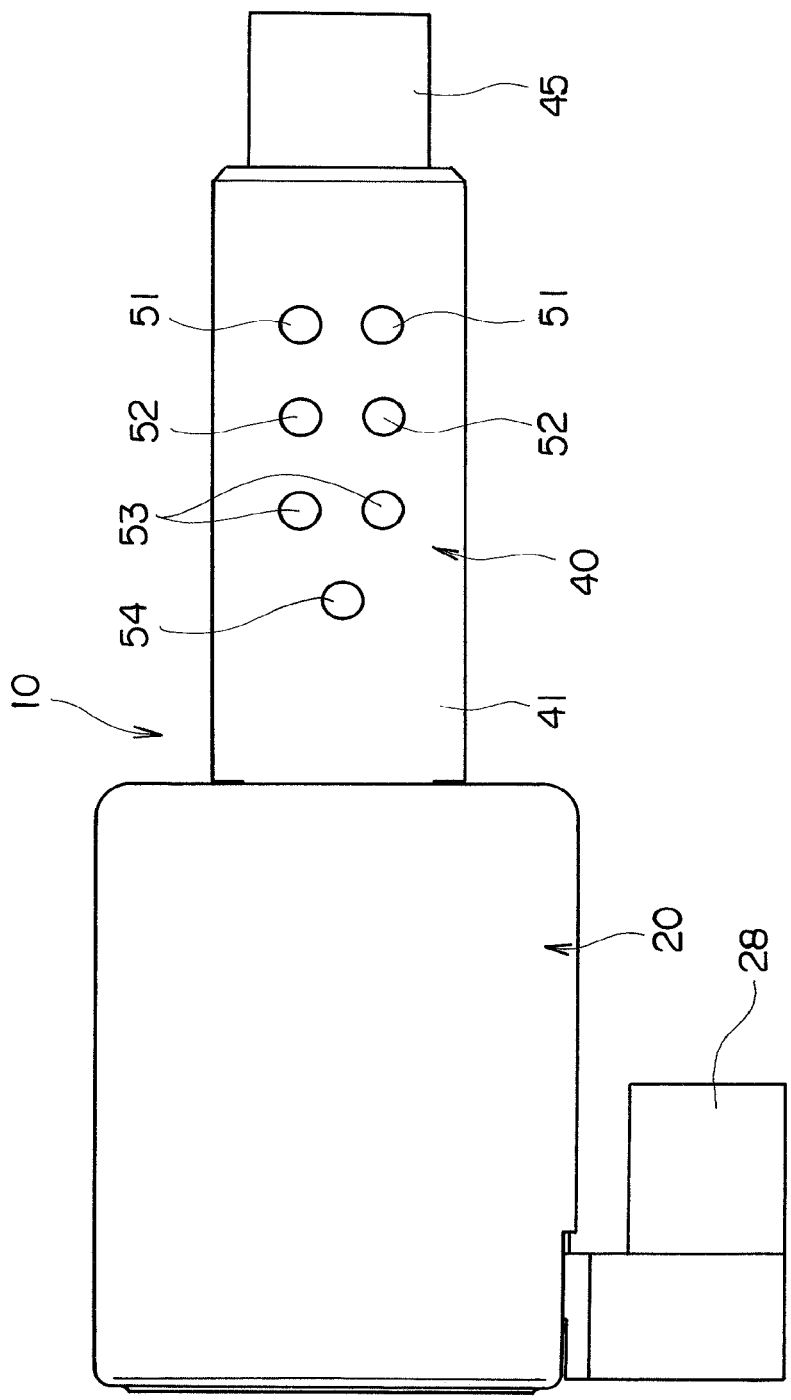
FIG. 1 is a side view of a solenoid valve according to an embodiment of the present invention.

Hereinafter, the present invention will be explained based on the embodiment shown in the drawings.

Figure 2:
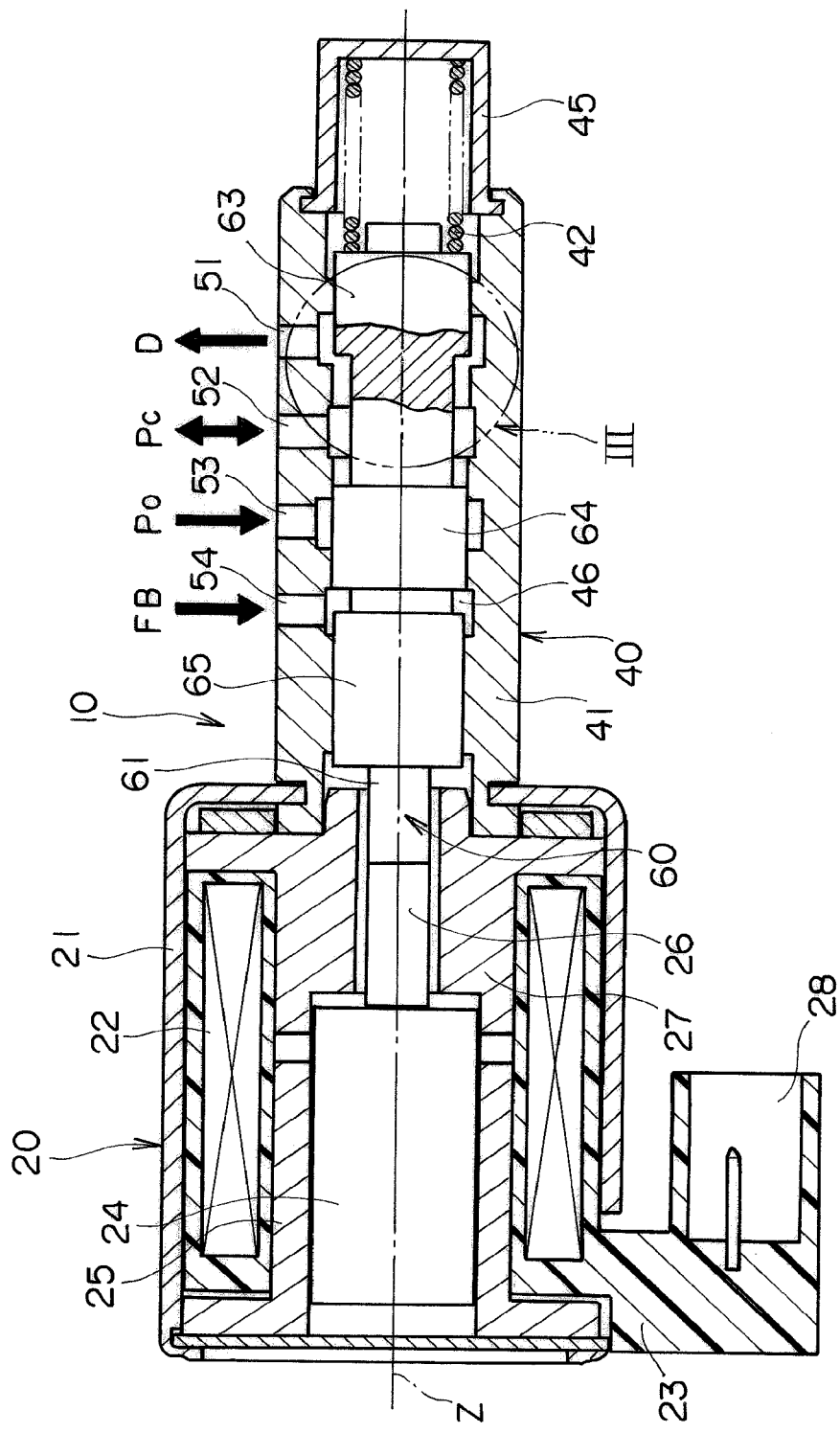
FIG. 2 is a cross-sectional view of the solenoid valve shown in FIG. 1.

As shown in FIG. 1 and FIG. 2, a solenoid valve 10 according to the embodiment of the present invention is a spool-type solenoid valve, and is used for controlling oil pressure of an automatic gearbox and the like of an automobile, for example.

The solenoid valve 10 comprises a solenoid portion (linear solenoid) 20 as an electromagnetic driving portion, a valve body 40 and a retainer 45. The solenoid portion 20 is mounted on an axial end (posterior end) of the valve body 40 along an axial direction Z, and the retainer 45 is mounted on the other axial end (anterior end) of the valve body 40 along the axial direction Z. The solenoid portion 20 has a case 21, within which a coil 22, a plunger 24 and a rod 26 are included.

The coil 22 is integrally formed with a resin molded body 23 mounted at an inner circumference side of the case 21 so as to be internally embedded in the resin molded body 23, so that control voltage is provided from a connector 28 protruding out of the case 21 to the coil 22. The coil 22 generates a magnetic field in a predetermined direction with a predetermined strength depending on the control voltage to generate a drive force to the plunger 24 and rod 26 in the axial direction Z, and the drive force is transferred to the spool 60 to become a force for moving the spool 60 in the axial direction.

A side ring 25 and a center post 27 are fixed at an inner circumference side of the resin molded body 23 along the axial direction. The plunger 24 is movably arranged on an inner circumference of the side ring 25 in the axial direction, and on an inner circumference of the center post 27, the rod 26 is movably arranged in the axial direction. The plunger 24 and rod 26 are removably connected, and an anterior end of the rod 26 is contacted with a posterior end of a spool shaft 61 of the spool 60.

An anterior end of the spool 60 contacts with a posterior end of a spring 42 internally mounted in the retainer 45, and the spool 60 is always pressed toward the rod 26 of the plunger 24 with an elastic force of the spring 42. Note that the retainer 45 is caulked with respect to an anterior end of a valve sleeve 41 of the valve body 40.

Material of the valve sleeve 41 is not particularly limited, and for example, aluminum, iron, resin and the like can be exemplified. Material of the retainer 45 is not particularly limited, and for example, iron, stainless steel, resin and the like can be exemplified.

An outlet port 51, a control port 52, an input port 53 and a feedback port 54 in this order from an anterior end side toward a posterior end side of the sleeve 41 are formed on the valve sleeve 41 as openings penetrating through a peripheral wall. The outlet ports 51, control ports 52 and input ports 53 are, as shown in FIG. 1, formed in pair along a circumferential direction of the valve sleeve 41, and only the feedback port 54 is formed alone.

Each flow passage cross-section of respective ports 51, 52, 53 and 54 is circular, the inner diameters D0 are preferably all the same, and φ 1 mm or more is preferable considering workability. In particular, the inner diameter D0 of the outlet port 51 is specifically determined in relation to the after-mentioned total flow passage cross-sectional area S0 of the outlet port 51 and maximum opening area 51 of the valve portion. The same can be said for the input port 53.

The input port 53 is a port where control fluid (e.g. operating oil) provided by a pump from a tank, not shown in the drawings, flows into. The outlet port 51 is a port providing the control fluid to an object (load) requesting the fluid, such as an automatic gearbox, not shown in the drawings. The feedback port 54 and the control port 52 communicate with each other outside the solenoid valve 10, and a part of the control fluid flowing out of the control port 52 flows into the feedback port 54.

Figure 3:
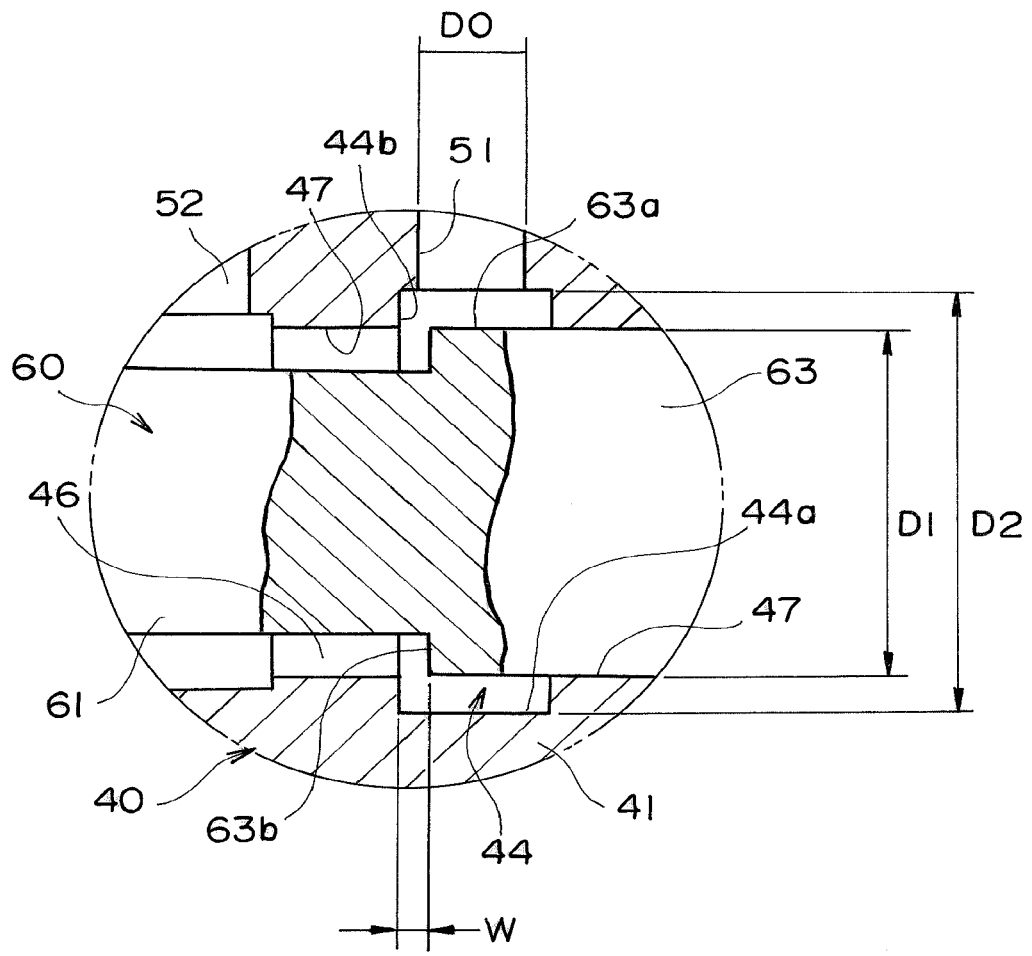
FIG. 3 is a cross-sectional view of an enlarged main portion showing the detail of a valve portion shown in FIG. 2.

The spool 60 is movably arranged in an axial center of the valve sleeve 41 along the axial direction Z, and first to third lands 63 to 65 are formed in sequence from an anterior end side of the spool shaft 61 along the axial direction Z, which are cylindrical large-diameter portions. The first land 63 constitutes, as shown in FIG. 3, a valve portion for opening and closing between the outlet port 51 and an internal flow passage 46 of the valve sleeve 41. The internal flow passage 46 of the valve sleeve 41 is a flow passage formed between the valve sleeve 41 and the spool shaft 61.

The second land 64 constitutes a valve portion for opening and closing a space between the input port 53 and the internal flow passage 46. Also, the third land 65 constitutes a valve portion for opening and closing between the feedback port 54 and the internal flow passage 46.

Figure 4:
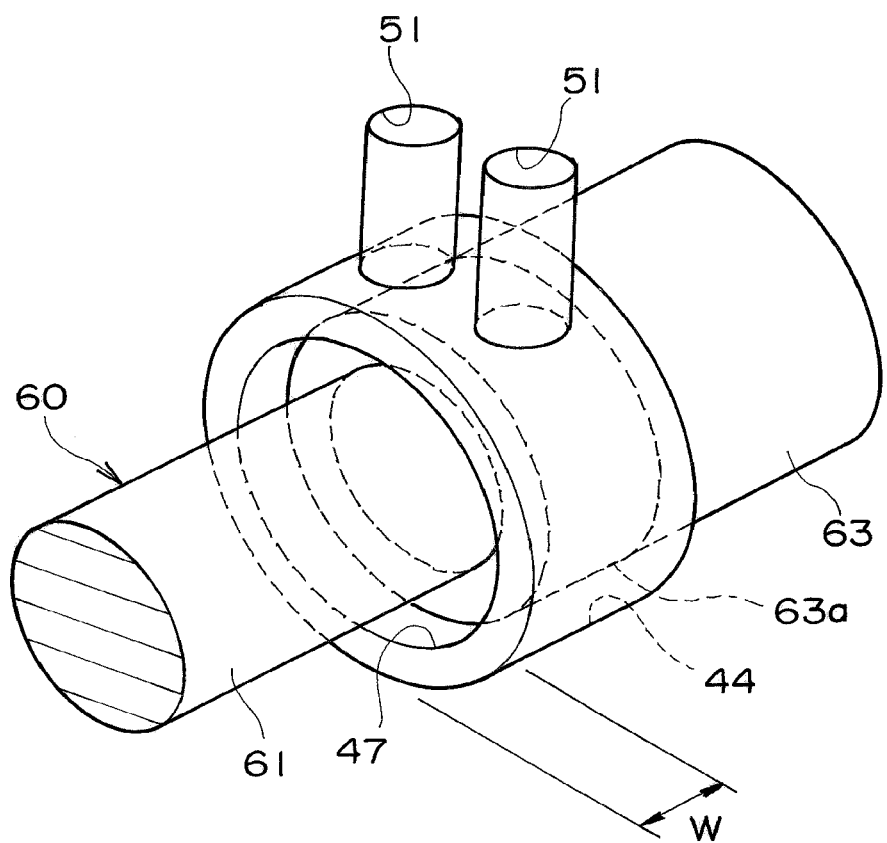
FIG. 4 is a schematic perspective view showing the detail of FIG. 3.

As shown in FIG. 3 and FIG. 4, a ring-shaped groove 44 extending in circumferential direction is formed on a valve seat inner circumference surface 47 of the valve sleeve 41 where the outlet port 51 is formed. An inner diameter D2 of an inner circumference surface 44a of the ring-shaped groove 44 is preferably approximately 110 to 140% larger than an inner diameter D1 of the valve seat inner circumference surface 47. The ring-shaped groove 44 which is formed to correspond to the outlet port 51 is formed with respect to the other ports 52 to 54 in the same way.

By moving the spool 60 in the axial direction and blocking the ring-shaped groove 44 with a first land portion 63 formed on the spool 60, the valve portion is closed to block communication between the outlet port 51 and the internal flow passage 46. More specifically, the spool 60 moves in the axial direction Z inside the valve sleeve 41, by which an outer circumference surface 63a of the first land portion 63 slides and moves along the valve seat inner circumference surface 47 of the valve sleeve 41, so that a distance W between a posterior end 63b of the first land portion 63 and a posterior end side face 44b of the ring-shaped groove becomes 0 or less. Namely, the first land portion 63 formed on the spool 60 blocks the ring-shaped groove 44, and the valve portion is closed to block the communication between the outlet port 51 and the internal flow passage 46.

The outer diameter of the outer circumference surface 63a of the first land 63 is equal to or less than the inner diameter D1 of the valve seat inner circumference surface 47, but is almost equal to the inner diameter D1 of the valve seat inner circumference surface 47. In the present embodiment, the outer diameter of the outer circumference surface 63a of the first land 63 is assumed to be the same as the inner diameter D1 of the valve seat inner circumference surface 47.

In the present embodiment, the relation of S1≥S0 is fulfilled where S1 is defined as an opening area of the valve portion between the outlet port 51 and the internal flow passage 46 when the spool 60 moves in the axial direction to maximally open the valve portion, and S0 is defined as the total flow passage cross-sectional area of a pair of outlet ports 51. Also, S1/S0 is preferably 1.0 to 3.0, further preferably 1.7 to 2.3. When S1/S0 is too small, the effects of the invention deteriorate, and when S1/S0 is too large, it may excessively decrease the inner diameter of the outlet port 51, resulting in an increase in flow passage resistance and too large a travel distance of the spool 60 in the axial direction for closing the valve portion, which are not preferable.

In this embodiment, the opening area S1 of the valve portion can be expressed by $\pi \times D1 \times Wmax$. Note that Wmax is the maximum value of the distance W between the posterior end 63b of the first land portion 63 and the posterior end side face 44b of the ring-shaped groove. Also, the total flow passage cross-sectional area "S0" of the pair of outlet ports 51 can be expressed by $\pi \times \pi \times (D0/2)^2$ where D0 is defined as the inner diameter of each outlet port 51.

Also similarly in the input port 53, the relation of S1'≥S0' is fulfilled where S1' is defined as an opening area of the valve portion between the input port 53 and the internal flow passage 46 when the spool 60 moves in the axial direction to maximally open the valve portion, and S0' is defined as the total flow passage cross-sectional area of the input port 53. S1'/S0' is preferably 1.0 to 3.0, further preferably 1.7 to 2.3.

Also, the outer diameters of the first land 63 and the second land 64 are approximately the same, and the outer diameter of the third land 65 is smaller than the outer diameters of the first land 63 and the second land 64. This is because the spool 60 is pressed along the axial direction Z toward the solenoid portion 20 by a pressure FB of control fluid internally introduced in the valve sleeve 41 through the feedback port 54. As a result, even when a pressure (input pressure) Po of the provided control fluid is changed, it is possible to inhibit a change in output pressure of the control fluid.

The anterior end of the spool 60 comes into contact with the spring 42 along the axial direction Z, and the posterior end comes into contact with the rod 26 along the axial direction Z. Therefore, the spool 60 receives the pressure of the spring 42 and the pressure due to movement of the plunger 24 via the rod 26 in addition to the pressure based on the pressure FB of the control fluid from the feedback port 54. These pressures allow the spool 60 to slide and to move inside the valve sleeve 41 in the axial direction Z.

In the solenoid valve 10 having such structure, the spool 60 stops moving at the position where the pressure of the spring 42, the force that the plunger 24 presses upon the spool 60 due to the electromagnetic force of the magnetic field generated by electricity provided to the coil 22, and the pressure that the spool 60 receives due to the pressure FB of the control fluid from the feedback port 54 come into balance with each other. Note that the symbol Pc is fluid pressure at the control port 52 and the symbol D is the fluid pressure at the outlet port 51 in FIG. 2.

The axial position of the spool 60 inside the valve sleeve 41 is controlled by the above-mentioned forces, and the outlet port 51, the control port 52, the input port 53 and the feedback port 54 are opened and closed to come into predetermined states. Note that the amount of the control fluid flowing from the control port 52 to the outlet port 51 can be determined by the distance W between the posterior end 63b of the first land portion 63 and the posterior end side face 44b of the ring-shaped groove.

In the thus-constituted solenoid valve 10, by providing the electricity to the coil 22 of the solenoid portion 20 from a control circuit not shown in the drawings, the coil 22 generates a magnetic field with a predetermined strength in a predetermined direction, and the plunger 24 moves by the electromagnetic force due to this magnetic field.

When the amount of current provided to the coil 22 is increased to give a large electromagnetic force to the plunger 24, the spool 60 moves toward the spring 42 in the valve sleeve 41 of the valve body 40. When the spool 60 moves toward the spring 42 in the valve sleeve 41, the distance W shown in FIG. 3 is increased, and the amount of the control fluid flowing from the control port 52 to the outlet port 51 is increased.

On the other hand, when the amount of current provided to the coil 22 is relatively reduced to decrease the electromagnetic force acting on the plunger 24, the spool 60 moves toward the solenoid portion 20 in the valve sleeve 41. When the spool 60 moves toward the solenoid portion 20 in the valve sleeve 41, the distance W shown in FIG. 3 is decreased, and the amount of the control fluid flowing from the control port 52 to the outlet port 51 is decreased.

In the solenoid valve 10 according to the present embodiment, as mentioned above, the relations of S1≥S0 and S1'≥S0' are fulfilled, resulting in good control stability and excellent contamination resistance. Furthermore, in the solenoid valve 10 of the present embodiment, because of the relations of S1≥S0 and S1'≥S0', it is easy to finely adjust (set) the maximum flow amount.

Also, in the present embodiment, by providing the ring-shaped groove 44, fluid flow from the internal flow passage 47 to the outlet port 51 via the valve portion becomes smooth, and axial movement of the spool 60 to the valve sleeve 41 also becomes smooth. Furthermore, the cross-sections of respective ports 51 to 54 are circular. Such ports 51 to 54 can easily be formed by drilling work and the like after the valve sleeve 41 is formed by cutting work of aluminum, which makes the production of the valve sleeve 41 easier.

Note that the present invention is not limited to the above-mentioned embodiment, and can be variously modified within the range of the present invention. For example, the arrangement of the ports 51 to 54 in the valve body 40 is not limited to the embodiment shown in the drawings, and the solenoid valve may have a structure in which the axial positions of the respective ports 51 to 54 are exchanged. Also, the number of the ports 51 to 54 is not particularly limited.

EXAMPLES

Hereinafter, the present invention will be explained based on further detailed example, but the present invention is not limited to the example.

Example 1

The input port 53 of the solenoid valve 10 shown in FIG. 1 to FIG. 4 was connected to a hydraulic pressure providing portion as a hydraulic system; the control port 52 was connected to an object (clutch) to be controlled; the outlet port 51 was connected to atmospheric pressure (external space); and the feedback port 54 was connected to the control port 52. The pressure Po at the input port was 2 MPa; the pressure Pc at the control port was 0 to 2 MPa; the pressure D at the outlet port was atmospheric pressure; and the pressure FB at the feedback port was 0 to 2 MPa.

It was confirmed that S1 at the outlet port was 17.4 mm$^2$; S0 was 8.3 mm$^2$; and the relation of S1≥S0 was fulfilled. Also, it was confirmed that S1' at the input port was 17.4 mm$^2$; S0' was 8.3 mm$^2$; and the relation of S1'≥S0' was fulfilled.

INDUSTRIAL APPLICABILITY

The solenoid valve of the present invention is preferably applied for hydraulic control of a hydraulic system and the like.

The invention claimed is:

1. A solenoid valve comprising a valve sleeve, inside of which a spool is movably arranged in an axial direction, and a solenoid portion mounted on an axial end of said valve sleeve to give a force for moving said spool in an axial direction, wherein:
    a plurality of ports are formed on said valve sleeve to properly communicate to an internal flow passage internally formed in the valve sleeve; and
    the plurality of said ports includes at least an outlet port, a control port and a feedback port and said control port and said feedback port are communicating with each other outside of said solenoid valve,
    an anterior end of said spool contacts a spring along an axial direction, and a posterior end of said spool contacts a rod along the axial direction, said spool receives a first pressure of said spring, a second pressure due to movement of a plunger which presses said spool via said rod due to an electromagnetic force of an magnetic field generated by electricity applied to the coil, and a third pressure based on a pressure generated by a control fluid from said feedback port,
    said spool moves in an axial direction so that the first pressure, the second pressure, and the third pressure come into balance with one another,
    a relation of S1≥S0 is fulfilled in at least an outlet port of the plurality of ports, where S1 is defined as an opening area of a valve portion between said outlet port and said internal flow passage when said spool moves in an axial direction to maximally open the valve portion, and S0 is defined as a total flow passage cross-sectional area of said outlet port;
    a ring-shaped groove extending in a circumferential direction is formed on an inner circumference surface of a valve seat of said valve sleeve, where said outlet port is formed, by moving said spool in an axial direction and blocking said ring-shaped groove with a first large-diameter portion formed on said spool, said valve portion is closed to block communication of said outlet port and said internal flow passage, and said opening area S1 can be expressed by $\pi \times D1 \times Wmax$, wherein said D1 is an outer diameter of said first large-diameter portion and said Wmax is the maximum value of the distance W between a posterior end of said first large-diameter portion and a posterior end side face of said ring-shaped groove.

2. The solenoid valve as set forth in claim 1, wherein:

one or more of said outlet port is formed, and a cross-section of each outlet port is circular.

3. The solenoid valve as set forth in claim 1, wherein:

a relation of $S1' \geq S0'$ is fulfilled in at least an input port of the plurality of ports, where S1' is defined as an opening area of a valve portion between said input port and said internal flow passage when said spool moves in an axial direction to maximally open the valve portion, and S0' is defined as a total flow passage cross-sectional area of said input port.

4. The solenoid valve as set forth claim 2, wherein a relation of $S1' \geq S0'$ is fulfilled in at least an input port of the plurality of ports, where S1' is defined as an opening area of a valve portion between said input port and said internal flow passage when said spool moves in axial direction to maximally open the valve portion, and S0' is defined as a total flow passage cross-sectional area of said input port.

5. The solenoid valve as set forth in claim 1, wherein the spool includes a second large-diameter portion having an outer diameter substantially equal to the outer diameter of the first large-diameter portion, and a third large-diameter portion having an outer diameter less than the outer diameters of both the first and second large-diameter portions, and wherein the second large-diameter portion is disposed between the first large-diameter portion and the third large-diameter portion.

6. The solenoid valve as set forth in claim 5, wherein the second large-diameter portion is configured to open and close a space between an input port of the plurality of ports and the internal flow passage, and the third large-diameter portion is configured to open and close a space between the feedback port and the internal flow passage.

\* \* \* \* \*